(12) United States Patent
Wang

(10) Patent No.: US 10,635,449 B2
(45) Date of Patent: Apr. 28, 2020

(54) METHOD AND APPARATUS FOR RUNNING GAME CLIENT

(71) Applicant: TENCENT TECHNOLOGY (SHENZHEN) COMPANY LIMITED, Shenzhen (CN)

(72) Inventor: Minghui Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 159 days.

(21) Appl. No.: 15/699,028

(22) Filed: Sep. 8, 2017

(65) Prior Publication Data

US 2017/0371678 A1    Dec. 28, 2017

Related U.S. Application Data

(63) Continuation of application No. PCT/CN2016/076581, filed on Mar. 17, 2016.

(30) Foreign Application Priority Data

Mar. 25, 2015   (CN) .......................... 2015 1 0134241

(51) Int. Cl.
*G06F 9/44* (2018.01)
*H04L 29/08* (2006.01)
(Continued)

(52) U.S. Cl.
CPC ................ *G06F 9/44* (2013.01); *A63F 13/35* (2014.09); *A63F 13/355* (2014.09); *A63F 13/48* (2014.09);
(Continued)

(58) Field of Classification Search
CPC ............. G06F 9/44; A63F 13/31; A63F 13/35
(Continued)

(56) References Cited

U.S. PATENT DOCUMENTS 6,203,433 B1    3/2001   Kume
9,333,431 B2 *  5/2016   Liu ........................ G06Q 10/10
(Continued)

FOREIGN PATENT DOCUMENTS

CN    101452402 A    6/2009
CN    102520987 A    6/2012
(Continued)

OTHER PUBLICATIONS

The World Intellectual Property Organization (WIPO) International Search Report for PCT/CN2016/076581 dated Jun. 3, 2016 7 Pages (including translation).

(Continued)

*Primary Examiner* — James E Springer
(74) *Attorney, Agent, or Firm* — Anova Law Group, PLLC

(57) ABSTRACT

The present disclosure belongs to the field of computer technologies, and discloses a method and apparatus for running a game client. The method includes: receiving a startup instruction of a target game client, and sending a startup request corresponding to the target game client to a server; receiving startup data, sent by the server, corresponding to the target game client, and starting, based on the startup data, the target game client; sending, when a preset data obtaining condition of a target game unit in the corresponding target game client is satisfied, a data request carrying a unit identifier of the target game unit to the server; and receiving operating data of the target game unit sent by the server, and running, based on the operating data, the target game unit. By means of the present disclosure, storage resources of a mobile terminal can be saved.

18 Claims, 3 Drawing Sheets

(51) Int. Cl.
*H04L 29/06* (2006.01)
*A63F 13/77* (2014.01)
*A63F 13/48* (2014.01)
*A63F 13/355* (2014.01)
*A63F 13/35* (2014.01)
*A63F 13/31* (2014.01)

(52) U.S. Cl.
CPC .............. *A63F 13/77* (2014.09); *H04L 67/12* (2013.01); *H04L 67/38* (2013.01); *A63F 13/31* (2014.09)

(58) Field of Classification Search
USPC .......................................................... 709/203
See application file for complete search history.

(56) References Cited

U.S. PATENT DOCUMENTS

| | | | | |
|---|---|---|---|---|
| 9,832,144 | B2* | 11/2017 | Li | H04L 51/04 |
| 10,013,262 | B2* | 7/2018 | Wang | G06F 9/451 |
| 2001/0018365 | A1* | 8/2001 | Orui | A63F 13/12 463/40 |
| 2003/0140313 | A1* | 7/2003 | Smith | G06F 16/335 715/255 |
| 2004/0266529 | A1* | 12/2004 | Chatani | A63F 13/12 463/40 |
| 2005/0027808 | A1* | 2/2005 | Piiroinen | H04W 88/02 709/206 |
| 2007/0054738 | A1* | 3/2007 | Muir | G07F 17/32 463/42 |
| 2007/0060363 | A1* | 3/2007 | Nguyen | G07F 17/32 463/42 |
| 2008/0200256 | A1* | 8/2008 | Gagner | G07F 17/323 463/42 |
| 2011/0105232 | A1* | 5/2011 | Godfrey | H04L 67/38 463/42 |
| 2012/0102191 | A1* | 4/2012 | Rabii | G06F 9/5011 709/224 |
| 2013/0029767 | A1* | 1/2013 | Boutin | A63F 13/77 463/42 |
| 2013/0055162 | A1* | 2/2013 | Arriola | G06F 16/44 715/811 |
| 2013/0203496 | A1* | 8/2013 | Kruglick | A63F 9/24 463/42 |
| 2015/0019677 | A1* | 1/2015 | Chen | H04L 67/2842 709/213 |
| 2016/0004408 | A1* | 1/2016 | Yun | G06F 3/04883 345/173 |
| 2017/0099592 | A1* | 4/2017 | Loeb | H04L 67/303 |
| 2017/0161056 | A1* | 6/2017 | Raanan | G06F 3/0604 |

FOREIGN PATENT DOCUMENTS

| | | |
|---|---|---|
| CN | 102571900 A | 7/2012 |
| CN | 103763307 A | 4/2014 |
| CN | 104011700 A | 8/2014 |
| CN | 104158851 A | 11/2014 |
| CN | 104780164 A | 7/2015 |
| WO | 9743846 A1 | 11/1997 |

OTHER PUBLICATIONS

The State Intellectual Property Office of the People's Republic of China (SIPO) Office Action 1 for 201510134241.X dated Jun. 6, 2016 7 Pages (including translation).

* cited by examiner

METHOD AND APPARATUS FOR RUNNING GAME CLIENT

RELATED APPLICATION

This application claims priority to PCT Application No. PCT/CN2016/076581, filed on Mar. 17, 2016, which claims Chinese Patent Application No. 201510134241X, entitled "METHOD AND APPARATUS FOR RUNNING GAME CLIENT", filed with the Chinese Patent Office on Mar. 25, 2015, which are incorporated herein by reference in their entirety.

FIELD OF THE TECHNOLOGY

Embodiments of the present invention relate to the field of computer technologies, and in particular, to a method and apparatus for running a game client.

BACKGROUND OF THE DISCLOSURE

With the development of mobile terminal technologies, mobile terminals such as mobile phones or tablet computers are used more widely and become one of the most important tools in people's daily work and life. People can browse information such as videos and news by using the mobile terminals, or play games on the mobile terminals.

When a user wants to run a game, the user can download an entire data packet of a corresponding game client on a mobile terminal, and install the data packet, and then the user can click a startup icon of the game client, so that the mobile terminal runs the game client. Often, a user may like multiple games, and needs to install multiple corresponding game clients on a mobile terminal, which may occupy lots of storage resources.

SUMMARY

To resolve the problem in the existing technology, embodiments of the present invention provide a method and apparatus for running a game client. The technical solutions are as follows:

According to a first aspect, a method for running a game client is provided, including: receiving a startup instruction of a target game client, and sending a startup request corresponding to the target game client to a server; receiving startup data, sent by the server, corresponding to the target game client, and starting, based on the startup data, the target game client; sending, when a preset data obtaining condition of a target game unit in the corresponding target game client is satisfied, a data request carrying a unit identifier of the target game unit to the server; and receiving operating data of the target game unit sent by the server, and running, based on the operating data, the target game unit.

According to a second aspect, a non-transitory computer-readable medium is provided. The non-transitory computer-readable medium contains computer-executable program for, when being executed by a processor, implementing a method for, the method including: receiving a startup instruction of a target game client, and send a startup request corresponding to the target game client to a server; receiving startup data, sent by the server, corresponding to the target game client, and start, based on the startup data, the target game client; sending, when a preset data obtaining condition of a target game unit in the corresponding target game client is satisfied, a data request carrying a unit identifier of the target game unit to the server; and receiving operating data of the target game unit sent by the server, and run, based on the operating data, the target game unit.

According to a third aspect, a terminal is provided. The terminal includes one or more processors; and a memory, the memory storing one or more programs, the one or more programs being configured to be executed by the one or more processors, and the one or more programs comprising instructions for: receiving a startup instruction of a target game client, and send a startup request corresponding to the target game client to a server; receiving startup data, sent by the server, corresponding to the target game client, and start, based on the startup data, the target game client; sending, when a preset data obtaining condition of a target game unit in the corresponding target game client is satisfied, a data request carrying a unit identifier of the target game unit to the server; and receiving operating data of the target game unit sent by the server, and run, based on the operating data, the target game unit.

Beneficial effects brought by the technical solutions provided in the embodiments of the present invention are as follows.

In the embodiments of the present invention, a startup instruction of a target game client is received, and a startup request corresponding to the target game client is sent to a server, startup data, sent by the server, corresponding to the target game client is received, and the target game client is started based on the startup data. When a preset data obtaining condition of a target game unit in the corresponding target game client is satisfied, a data request carrying a unit identifier of the target game unit is sent to the server, operating data of the target game unit sent by the server is received, and the target game unit is run based on the operating data. In this way, a mobile terminal can obtain the operating data of the target game unit from the server when the preset data obtaining condition is satisfied, and run the target game unit. There is no need to install an entire data packet of a game client on the mobile terminal, so as to save storage resources of the mobile terminal.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
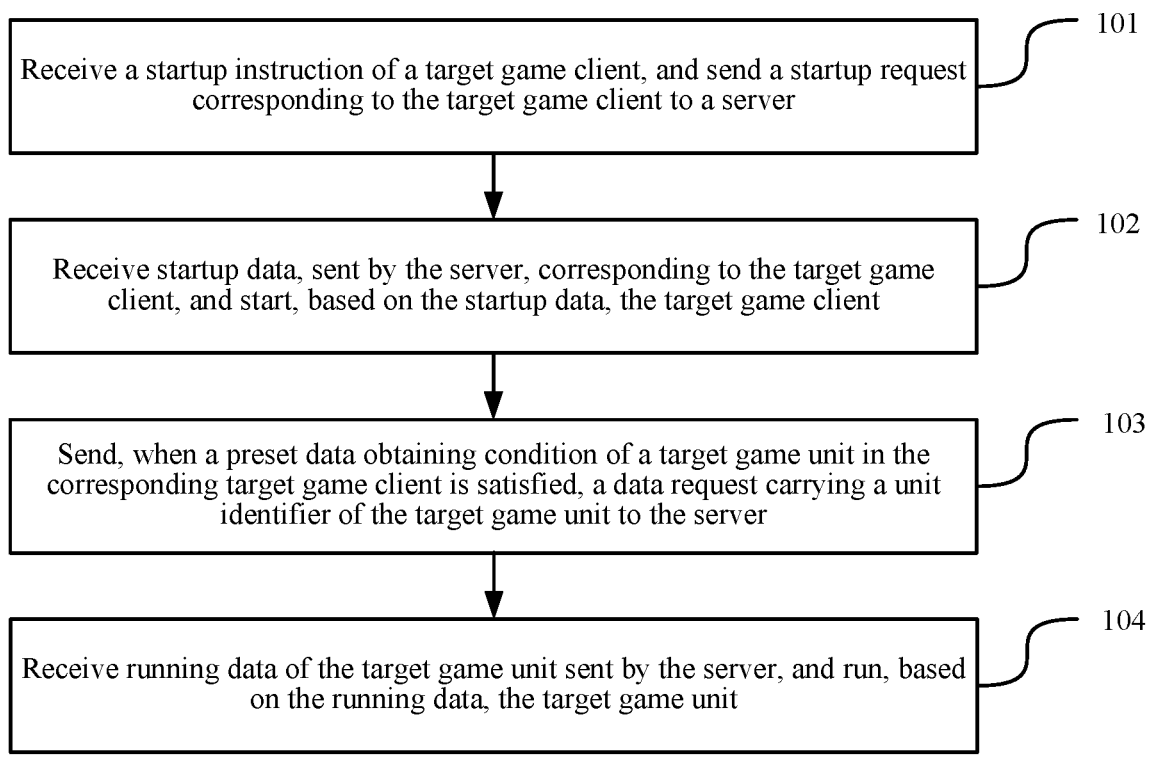
FIG. 1 is a flowchart of a method for running a game client according to an embodiment of the present invention.

An embodiment of the present invention provides a method for running a game client. As shown in FIG. 1, a processing process of the method may include the following steps:

Step 101: Receive a startup instruction of a target game client, and send a startup request corresponding to the target game client to a server.

Step 102: Receive startup data, sent by the server, corresponding to the target game client, and start, based on the startup data, the target game client.

Step 103: Send, when a preset data obtaining condition of a target game unit in the corresponding target game client is satisfied, a data request carrying a unit identifier of the target game unit to the server.

Step 104: Receive operating data of the target game unit sent by the server, and run, based on the operating data, the target game unit.

In this embodiment of the present invention, a startup instruction of a target game client is received, and a startup request corresponding to the target game client is sent to a server, startup data, sent by the server, corresponding to the target game client is received, and the target game client is started based on the startup data. When a preset data obtaining condition of a target game unit in the corresponding target game client is satisfied, a data request carrying a unit identifier of the target game unit is sent to the server, operating data of the target game unit sent by the server is received, and the target game unit is run based on the operating data. In this way, a mobile terminal can obtain the operating data of the target game unit from the server when the preset data obtaining condition is satisfied, and run the target game unit. There is no need to install an entire data packet of a game client on the mobile terminal, so as to save storage resources of the mobile terminal.

An embodiment of the present invention provides a method for running a game client. Optionally, the method is executed by a terminal. The terminal may be a mobile terminal such as a mobile phone or a tablet computer.

The following performs detailed description on the processing process shown in FIG. 1 with reference to specific implementation manners, and content of the processing process may be as follows:

Step 101: Receive a startup instruction of a target game client, and send a startup request corresponding to the target game client to a server.

In an implementation manner as an example, a mobile terminal may store startup icons of multiple game clients in advance, and display these startup icons. When a user hopes to start a game client (that is, a target game client), the user can click a startup icon corresponding to the target game client in a display interface of the mobile terminal. The mobile terminal may receive a startup instruction of the target game client, and then may send a startup request corresponding to the target game client to a server. The startup request may carry an identifier of the target game client.

Optionally, a mobile terminal may display a game list, and the game list includes a startup icon of at least one game client, and a corresponding processing process may be as follows: receiving a game-list display instruction, and sending a game-list display request to the server; and receiving display data of the game list, sent by the server, and displaying the game list based on the display data of the game list.

In an implementation manner as an example, a skilled person may preset corresponding program code in a system program of the mobile terminal, so that an option for displaying a game list may be set in the mobile terminal.

For example, an option of a game mode may be set in a system setting page of the mobile terminal. When a user clicks the option of the game mode, the mobile terminal may receive a game-list display instruction. Alternatively, a display icon of a game list may be set in the mobile terminal, and when a user clicks the display icon, the mobile terminal may receive a game-list display instruction.

After receiving the game-list display instruction, the mobile terminal may send a game-list display request to the server. The game-list display request may carry an identifier of the mobile terminal. Optionally, the identifier of the mobile terminal is an IMEI (International Mobile Equipment Identity).

The server may store data of multiple game clients in advance, and after a mobile terminal runs a game client by using the server, the server may further store operating information operating information of the game client and an identifier of the mobile terminal correspondingly. The operating information operating information of the game client may include an identifier of the game client and progress information (for example, the game client is run to the $32^{nd}$ stage until the last time) of running the game client by the mobile terminal. After receiving the game-list display instruction sent by the mobile terminal, the server may parse the game-list display instruction and obtain an identifier of the mobile terminal in the game-list display instruction, then may obtain an identifier (for example, a startup icon of a game client) of a game client that is run on the mobile terminal and progress information (for example, a quantity of stages of each game client that is run last time) of each game client that is run, and then may generate display data of a corresponding game list, and send the display data to the foregoing mobile terminal, so as to perform subsequent processing.

In addition, the server may further determine a game client whose time difference between a release time and a current time is within a duration range and a game client whose quantity of times of user requests is greater than a preset threshold, add identifiers of these game clients to the display data of the game list, and send the display data to the mobile terminal. Simply, a game client belonging to a game list includes: a game client historically used by a user, and/or a newly released game client, and/or a game client that is hot in a recent period of time. Hot refers that a frequency at which a game client is used by the user in the recent period of time exceeds a preset frequency.

As an optional implementation manner, the "identifier of a mobile terminal" may be replaced by using a user account. The user account is an account registered by the user on the server end for identifying a user identity, for example, an instant messaging account.

Figure 2:
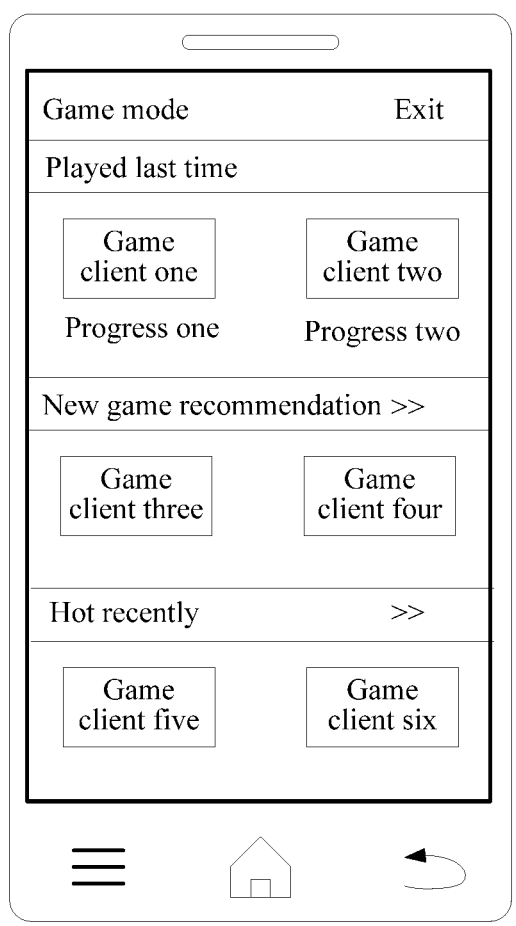
FIG. 2 is a schematic diagram when an interface is displayed according to an embodiment of the present invention.

After receiving the display data of the game list, sent by the server, the mobile terminal may display, based on the display data, the corresponding game list. As shown in FIG. 2, the game list may display a startup icon of a game client that a user runs last time and progress information of each game client that is run last time. In addition, the game list may further display a startup icon of a game client whose time difference between a release time and a current time is within a duration range and a startup icon of a game client whose quantity of times of user requests is greater than a preset threshold.

In addition, in addition to the identifier of the mobile terminal, the game-list display request sent by the mobile terminal may further carry an identifier (for example, a phone number) of an operator corresponding to the mobile terminal. After receiving the game-list display request, the server may determine the operator corresponding to the mobile terminal according to the identifier of the operator, and sends the identifier of the mobile terminal to a server of the operator. Traffic consumed by the mobile terminal in a state in which a game mode is enabled is not recorded in a tariff of the mobile terminal. When the user exits the game mode, the mobile terminal may notify the server that the mobile terminal exits the game mode. At this time, the server may instruct the server of the operator to start to charge traffic consumed by the mobile terminal.

Optionally, for a case in which the mobile terminal can display the game list, correspondingly, the foregoing processing process of receiving a startup instruction of a target game client may be as follows: receiving a startup instruction triggered by clicking a startup icon of a target game client. That is, the mobile terminal receives a startup instruction, the startup instruction being triggered after a user clicks a startup icon of a target game client.

In an implementation manner as an example, a user may click a game client (that is, a target game client) that the user hopes to run in the game list displayed in the mobile terminal, and the mobile terminal may receive a corresponding startup instruction, and then send a startup request corresponding to the target game client to the server.

It should be noted that the game client that is run in the mobile terminal in this embodiment merely needs to store some basic data, for example, display data of the startup icon, and code data during communication with the server.

Step 102: Receive startup data, sent by the server, corresponding to the target game client, and start, based on the startup data, the target game client.

The startup data includes at least configuration data and display data of a basic interface, and the configuration data may include sound-effect setting data, difficulty setting data, partial logical processing data, and the like of the game client.

In an implementation manner as an example, after the mobile terminal sends the startup request corresponding to the target game client to the server, the server may receive the startup request, then parse the startup request, and obtain an identifier of the target game client in the startup request; then, the server may parse data of the target game client stored in the server, obtain startup data in the data, and then send the startup data to the mobile terminal. After receiving the startup data, the mobile terminal may start, based on the received startup data, the target game client.

Step 103: Send, when a preset data obtaining condition of a target game unit in the corresponding target game client is satisfied, a data request carrying a unit identifier of the target game unit to the server.

In an implementation manner as an example, a data obtaining condition of a target game unit in the corresponding target game client may be preset. When the data obtaining condition is satisfied, the mobile terminal may send a data request carrying a unit identifier of the target game unit to the server.

A game generally includes several game units. Each game unit is a set obtained by performing logical divisions on a game process according to at least one of elements: game stages, game stories, game rounds, game maps, and game time. For example, a game may have multiple stages, and each stage is a game unit; for another example, a game has multiple game rounds, and each game round is a game unit; for still another example, a game has multiple instance maps, and a game process corresponding to each instance map is a game unit; and so on. This is not described in detail again. Each game unit further has a corresponding unit identifier.

For example, when a user clicks a game unit (that is, a target game unit), the mobile terminal sends a data request carrying a unit identifier of the target game unit to the server. Alternatively, when a quantity of stages that are run currently and a quantity of stages of the target game unit are less than a preset threshold, thee mobile terminal sends a data request carrying a unit identifier of the target game unit to the server.

Step 104: Receive operating data of the target game unit sent by the server, and run, based on the operating data, the target game unit.

The operating data of the target game unit includes at least display data of the target game unit.

In an implementation manner as an example, after the mobile terminal sends the data request carrying the unit identifier of the target game unit to the server, the server receives the data request; then the server may parse the data request, and obtain the unit identifier of the target game unit in the data request. The server may determine a game client corresponding to the target game unit. Further, the server may search the data of the game client for data of the target game unit, and then send the found data to the mobile terminal. After receiving operating data of the target game unit sent by the server, the mobile terminal may display the target game unit according to display data included in the operating data. In addition, the operating data may further include logical processing data of the target game unit, so that a user can perform an operation in the target game unit.

The logical processing data is data used for processing user operation information. For example, the user triggers a click operation in a game picture, the mobile terminal may generate user operation information according to the click operation, and the user operation information is processed according to the logical processing data.

In addition, after the mobile terminal enables a game mode, the server can invoke an interface of the mobile terminal, and block information, such as a system notification, a push message, an SMS message, and a call, of the mobile terminal. After the mobile terminal exits the game mode, the server can cancel the block on the mobile terminal, so that the mobile terminal does not give a hint about the foregoing information in a case in which the game mode is enabled, thereby not disturbing an operation of the user in the target game unit.

Optionally, the mobile terminal may execute a control instruction in the target game client by using the server, and a corresponding processing process may be as follows: sending, when user operation information is received, the user operation information to the server, so that the server determines a control instruction corresponding to the user operation information; and receiving the control instruction sent by the server, and executing the control instruction in the target game client.

In an implementation manner as an example, the user may perform an operation in the target game client, for example, the user performs an operation of sliding to the left in the target game client, and the mobile terminal can receive user operation information about sliding to the left and then send the user operation information to the server. After receiving the user operation information, the server can determine a control instruction corresponding to the received user operation information according to a pre-stored correspondence between the user operation information and the control instruction in the target game client, and then send the control instruction to the mobile terminal. After receiving the control instruction sent by the server, the mobile terminal can execute the control instruction in the target game client.

Optionally, when two or more game units exist in the target game client, step 104 may be repeatedly executed for many times.

Optionally, the mobile terminal may delete data of a game client stopping being run, and a corresponding processing process may be as follows: deleting the startup data and the operating data of the target game client when duration in which the target game client stops being run reaches a preset first duration threshold.

In an implementation manner as an example, when the target game client stops being run, the mobile terminal may start timing, and if the duration in which the target game client stops being run reaches a preset first duration threshold, the mobile terminal may delete the operating data and the startup data of the target game client. For example, the first duration threshold is two hours, and after the duration in which the target game client stops being run reaches two hours, the mobile terminal deletes the operating data and the startup data of the target game client.

Optionally, the mobile terminal may delete data of a game unit stopping being run, and a corresponding processing process may be as follows: deleting the operating data of the target game unit when duration in which the target game unit stops being run and another game unit except for the target game unit is run reaches a preset second duration threshold.

In an implementation manner as an example, when the mobile terminal detects that the target game unit stops being run and another game unit except for the target game unit is in a running state, the mobile terminal may start timing, and if duration in which the target game unit stops being run and another game unit except for the target game unit is run reaches a preset second duration threshold, the mobile terminal can delete the operating data of the target game unit. For example, the second duration threshold is ten minutes, and after duration in which a $3^{rd}$ stage of a game client stops being run and another stage except for the $3^{rd}$ stage is run reaches ten minutes, the mobile terminal deletes operating data of the $3^{rd}$ stage. Optionally, the another game unit and the target game unit are different game units belonging to the target game client.

Optionally, the mobile terminal may delete data of a game unit whose pause time is relatively long, and a corresponding processing process may be as follows: deleting the operating data of the target game unit when pause duration of the target game unit reaches a preset third duration threshold; sending a data request carrying the unit identifier of the target game unit to the server when a pause cancellation instruction of the target game unit is received; and receiving the operating data of the target game unit sent by the server, and running, based on the operating data, the target game unit.

In an implementation manner as an example, when a user clicks a pause option of the target game unit, the mobile terminal may receive a target game unit pause instruction, and start timing. If pause duration of the target game unit reaches a preset third duration threshold, the mobile terminal may delete the operating data of the target game unit. Later, if the user clicks a pause cancellation option, the mobile terminal may receive a pause cancellation instruction of the target game unit. At this time, the mobile terminal may send the data request carrying the unit identifier of the target game unit to the server, so that the server may send the operating data of the target game unit. After receiving the operating data of the target game unit, the mobile terminal may run, based on the operating data, the target game unit.

Optionally, the mobile terminal may delete operating data of a game unit whose receiving time is the earliest, and a corresponding processing process may be as follows: deleting operating data of a game unit whose receiving time is the earliest when a data volume of the locally-stored operating data reaches a preset data volume threshold.

In an implementation manner as an example, the mobile terminal may preset a data volume threshold of a data volume of the stored operating data. The mobile terminal may detect a data volume of the operating data that has been stored, and when the data volume of the stored operating data reaches the preset data volume threshold, the mobile terminal may delete operating data of a game unit whose receiving time is the earliest. For example, the preset data volume threshold is 500K, and when detecting that the data volume of the stored operating data reaches 500K, the mobile terminal deletes operating data of a game unit whose receiving time is the earliest.

In this embodiment of the present invention, a startup instruction of a target game client is received, and a startup request corresponding to the target game client is sent to a server, startup data, sent by the server, corresponding to the target game client is received, and the target game client is started based on the startup data. When a preset data obtaining condition of a target game unit in the corresponding target game client is satisfied, a data request carrying a unit identifier of the target game unit is sent to the server, operating data of the target game unit sent by the server is received, and the target game unit is run based on the operating data. In this way, a mobile terminal can obtain the operating data of the target game unit from the server when the preset data obtaining condition is satisfied, and run the target game unit. There is no need to install an entire data packet of a game client on the mobile terminal, so as to save storage resources of the mobile terminal.

According to this embodiment of the present invention, related startup data and operating data are deleted when running is stopped, or when running is suspended, or when a data volume of locally-stored operating data reaches a preset data volume threshold, so as to save storage resources of a mobile terminal in a game process or after a game ends.

According to this embodiment of the present invention, a system notification, a push message, an SMS message, and a call that are irrelevant to a game are blocked, so that a user is not disturbed in a game process.

Figure 3:
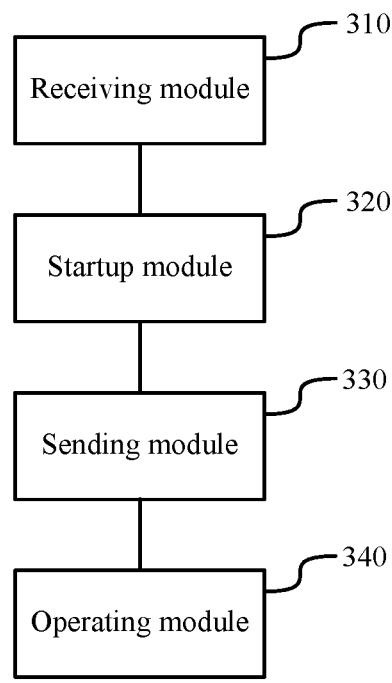
FIG. 3 is a schematic structural diagram of an apparatus for running a game client according to an embodiment of the present invention.

Based on a same technical concept, an embodiment of the present invention further provides an apparatus for running a game client. As shown in FIG. 3, the apparatus includes: a receiving module 310, configured to: receive a startup instruction of a target game client, and send a startup request corresponding to the target game client to a server; a startup module 320, configured to: receive startup data, sent by the server, corresponding to the target game client, and start, based on the startup data, the target game client; a sending module 330, configured to send, when a preset data obtaining condition of a target game unit in the corresponding target game client is satisfied, a data request carrying a unit identifier of the target game unit to the server; and an operating module 340, configured to: receive operating data of the target game unit sent by the server, and run, based on the operating data, the target game unit. These program modules may be stored in a non-transitory computer-readable medium, and when being executed by a processor, implementing a method for running a game client.

Optionally, the sending module 330 is further configured to: send, when user operation information is received, the user operation information to the server, so that the server determines a control instruction corresponding to the user operation information; and the receiving module 310 is further configured to: receive the control instruction sent by the server, and execute the control instruction in the target game client.

Optionally, the receiving module 310 is further configured to: receive a game-list display instruction, and send a game-list display request to the server; and receive display data of a game list, sent by the server, and display the game list based on the display data of the game list, the game list including a startup icon of at least one game client; and the receiving module 310 is configured to: receive a startup instruction triggered by clicking a startup icon of the target game client.

Optionally, the apparatus further includes: a deletion module, configured to: delete the operating data and the startup data of the target game client when duration in which the target game client stops being run reaches a preset first duration threshold.

Optionally, the apparatus further includes: a deletion module, configured to: delete the operating data of the target game unit when duration in which the target game unit stops being run and another game unit except for the target game unit is run reaches a preset second duration threshold.

Optionally, the apparatus further includes: a deletion module, configured to: delete the operating data of the target game unit when pause duration of the target game unit reaches a preset third duration threshold; send the data request carrying the unit identifier of the target game unit to the server when a pause cancellation instruction of the target game unit is received; and receive operating data of the target game unit sent by the server, and run, based on the operating data, the target game unit.

Optionally, the apparatus further includes: a deletion module, configured to: delete operating data of a game unit whose receiving time is the earliest when a data volume of the locally-stored operating data reaches a preset data volume threshold.

Optionally, the startup data includes at least configuration data and display data of a basic interface, and the operating data of the target game unit includes at least display data of the target game unit.

Optionally, the apparatus further includes: a block module, configured to: block at least one type of information: a system notification, a push message, an SMS message, or a call.

In this embodiment of the present invention, a startup instruction of a target game client is received, and a startup request corresponding to the target game client is sent to a server, startup data, sent by the server, corresponding to the target game client is received, and the target game client is started based on the startup data. When a preset data obtaining condition of a target game unit in the corresponding target game client is satisfied, a data request carrying a unit identifier of the target game unit is sent to the server, operating data of the target game unit sent by the server is received, and the target game unit is run based on the operating data. In this way, a mobile terminal can obtain the operating data of the target game unit from the server when the preset data obtaining condition is satisfied, and run the target game unit. There is no need to install an entire data packet of a game client on the mobile terminal, so as to save storage resources of the mobile terminal.

According to this embodiment of the present invention, related startup data and operating data are deleted when running is stopped, or when running is suspended, or when a data volume of locally-stored operating data reaches a preset data volume threshold, so as to save storage resources of a mobile terminal in a game process or after a game ends.

According to this embodiment of the present invention, a system notification, a push message, an SMS message, and a call that are irrelevant to a game are blocked, so that a user is not disturbed in a game process.

It should be noted that division of the above functional modules are only described as an example when the apparatus for running a game client provided in the foregoing embodiments runs a game client. In actual applications, the functions may be allocated according to needs to be implemented by different functional modules, that is, the internal structure of the apparatus is divided into different functional modules to complete all or some of the above described functions. In addition, the apparatus for running a game client provided in the foregoing embodiment is based on the same concept as the method for running a game client in the foregoing embodiment. For the specific implementation process, refer to the method embodiment, and the details are not described herein again.

Figure 4:
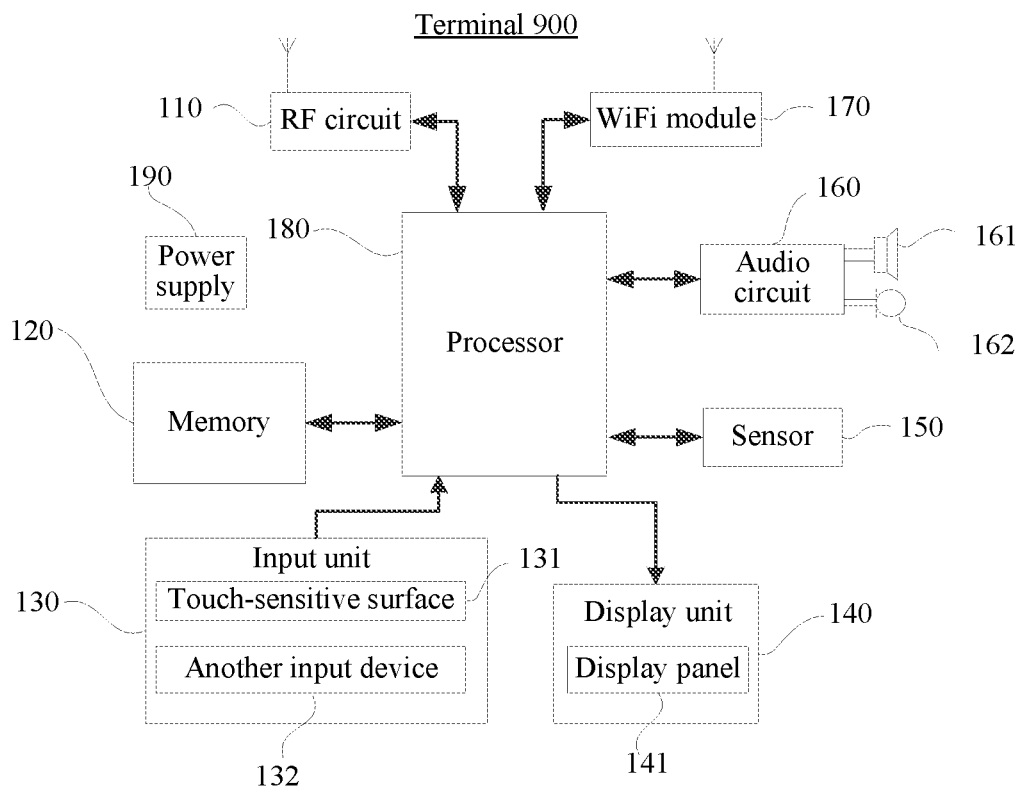
FIG. 4 is a schematic structural diagram of a terminal according to an embodiment of the present invention.

Referring to FIG. 4, FIG. 4 is a schematic structural diagram of a terminal involved in an embodiment of the present invention, and the terminal may be configured to implement the method for running a game client provided in the foregoing embodiment. Specifically:

A terminal 900 may include components such as an RF (Radio Frequency) circuit 110, a memory 120 including one or more computer readable storage mediums, an input unit 130, a display unit 140, a sensor 150, an audio circuit 160, a WiFi (wireless fidelity) module 170, a processor 180 including one or more processing cores, and a power supply 190. A person skilled in the art may understand that the structure of the terminal shown in FIG. 4 does not constitute a limitation to the terminal, and the terminal may include more components or fewer components than those shown in the figure, or some components may be combined, or a different component deployment may be used.

The RF circuit 110 may be configured to receive and send signals in an information receiving and sending process or a call process. Particularly, the RF circuit 110 receives downlink information from a base station, then delivers the downlink information to the one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, an LNA (Low Noise Amplifier), and a duplexer. In addition, the RF circuit 110 may also communicate with a network and another device by means of wireless communication. The wireless communication may use any communications standard or protocol, which includes, but is not limited to, GSM (Global System for Mobile communications), GPRS (General Packet Radio Service), CDMA (Code Division Multiple Access), WCDMA (Wideband Code Division Multiple Access), LTE (Long Term Evolution), e-mail, SMS (Short Messaging Service), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 900, and the like. In addition, the memory 120 may include a high speed random access memory, and may also include a non-volatile memory such as at least one magnetic disk storage device, a flash memory, or another volatile solid-state storage device. Correspondingly, the memory 120 may further include a memory controller, to provide access of the processor 180 and the input unit 130 to the memory 120.

The input unit 130 may be configured to receive input digit or character information, and generate a keyboard, mouse, joystick, optical or track ball signal input related to the user setting and function control. Specifically, the input unit 130 may include a touch-sensitive surface 131 and another input device 132. The touch-sensitive surface 131, which may also be referred to as a touch display screen or a touch control board, may collect a touch operation of a user on or near the touch-sensitive surface (such as an operation of a user on or near the touch-sensitive surface 131 by using any suitable object or accessory such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using a type such as a resistive, capacitive, infrared, or surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 900, and these graphical user interfaces may be constituted by an image, a text, an icon, a video, and any combination of them. The display unit 140 may include a display panel 141. Optionally, the display panel 141 may be configured by using an LCD (Liquid Crystal Display), an OLED (Organic Light-Emitting Diode), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 4, the touch-sensitive surface 131 and the display panel 141 are used as two separate parts to implement input and output functions, in some embodiments, the touch-sensitive surface 131 and the display panel 141 may be integrated to implement the input and output functions.

The terminal 900 may further include at least one sensor 150 such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 900 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the terminal 900, are not further described herein.

The audio circuit 160, a loudspeaker 161, and a microphone 162 may provide audio interfaces between the user and the terminal 900. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 900.

WiFi belongs to a short-distance wireless transmission technology. The terminal 900 may help, by using the WiFi module 170, the user receive and send e-mails, browse a webpage, access streaming media, and so on, which provides wireless broadband Internet access for the user. Although FIG. 4 shows the WiFi module 170, it may be understood that the WiFi module is not a necessary component of the terminal 900, and when required, may be omitted as long as the scope of the essence of the present disclosure is not changed.

The processor 180 is the control center of the terminal 900, and is connected to various parts of the mobile phone by using various interfaces and lines. By running or executing the software program and/or module stored in the memory 120, and invoking data stored in the memory 120, the processor 180 performs various functions and data processing of the terminal 900, thereby performing overall monitoring on the mobile phone. Optionally, the processor 180 may include the one or more processing cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The terminal 900 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include any component such as one or more direct-current or alternating-current power supplies, a recharge system, a power-supply failure detection circuit, a power-supply converter, an inverter, or a power state indicator.

Although not shown in the figure, the terminal 900 may further include a camera, a Bluetooth module, and the like, which are not further described herein. Specifically, in this embodiment, the display unit of the terminal 900 is a touchscreen display, and the terminal 900 further includes a memory and one or more programs. The one or more programs are stored in the memory and configured to be executed by one or more processors. The one or more programs contain instructions for performing the following operations: receiving a startup instruction of a target game client, and sending a startup request corresponding to the target game client to a server; receiving startup data, sent by the server, corresponding to the target game client, and starting, based on the startup data, the target game client; sending, when a preset data obtaining condition of a target game unit in the corresponding target game client is satisfied, a data request carrying a unit identifier of the target game unit to the server; and receiving operating data of the target game unit sent by the server, and running, based on the operating data, the target game unit.

Optionally, the one or more programs further contain instructions for performing the following operations: sending, when user operation information is received, the user operation information to the server, so that the server determines a control instruction corresponding to the user operation information; and receiving the control instruction sent by the server, and executing the control instruction in the target game client.

Optionally, the one or more programs further contain instructions for performing the following operations: receiving a game-list display instruction, and sending a game-list display request to the server; and receiving display data of a game list, sent by the server, and displaying the game list based on the display data of the game list, the game list including a startup icon of at least one game client; and the receiving a startup instruction of a target game client includes: receiving the startup instruction, the startup instruction being triggered after clicking a startup icon of the target game client.

Optionally, the one or more programs further contain an instruction for performing the following operation: deleting the startup data and the operating data of the target game client when duration in which the target game client stops being run reaches a preset first duration threshold.

Optionally, the one or more programs further contain an instruction for performing the following operation: deleting the operating data of the target game unit when duration in which the target game unit stops being run and another game unit except for the target game unit is run reaches a preset second duration threshold.

Optionally, the one or more programs further contain instructions for performing the following operations: deleting the operating data of the target game unit when pause duration of the target game unit reaches a preset third duration threshold; sending the data request carrying the unit identifier of the target game unit to the server when a pause cancellation instruction of the target game unit is received; and receiving the operating data of the target game unit sent by the server, and running, based on the operating data, the target game unit.

Optionally, the one or more programs further contain an instruction for performing the following operation: deleting operating data of a game unit whose receiving time is the earliest when a data volume of the locally-stored operating data reaches a preset data volume threshold.

Optionally, the startup data includes at least configuration data and display data of a basic interface, and the operating data of the target game unit includes at least display data of the target game unit.

Optionally, the one or more programs further contain an instruction for performing the following operation: blocking at least one type of information: a system notification, a push message, an SMS message, or a call.

In this embodiment of the present invention, a startup instruction of a target game client is received, and a startup request corresponding to the target game client is sent to a server, startup data, sent by the server, corresponding to the target game client is received, and the target game client is started based on the startup data. When a preset data obtaining condition of a target game unit in the corresponding target game client is satisfied, a data request carrying a unit identifier of the target game unit is sent to the server, operating data of the target game unit sent by the server is received, and the target game unit is run based on the operating data. In this way, a mobile terminal can obtain the operating data of the target game unit from the server when the preset data obtaining condition is satisfied, and run the target game unit. There is no need to install an entire data packet of a game client on the mobile terminal, so as to save storage resources of the mobile terminal.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

What is described above is merely exemplary embodiments of the present invention, and is not intended to limit the present disclosure. Any modifications, equivalent variations, and improvements made in accordance with the spirits and principles of the present disclosure shall fall within the protection scope of the present disclosure.

What is claimed is:

1. A method for running a game client, comprising:
    in response to receiving a game-list display instruction, sending a game-list display request to a server;
    receiving display data of a game list, sent by the server;
    displaying the game list based on the display data of the game list, the game list including a startup icon associated with a target game client, wherein the display data includes at least one of last run time of the target game client, progress status of last run of the target game client, an indicator identifying that a time difference between release time of the target game client and a current time is within a duration range, and an indicator identifying that a number of times of user requests on the target game client reaches a preset threshold;
    receiving a startup instruction of the target game client upon detecting a user selection of the startup icon of the target game client, and sending a startup request corresponding to the target game client to the server;
    receiving startup data, sent by the server, corresponding to the target game client, and starting, based on the startup data, the target game client;
    sending, when a preset data obtaining a condition of a target game unit in the corresponding target game client is satisfied, a data request carrying a unit identifier of the target game unit to the server;
    receiving operating data of the target game unit sent by the server, and running, based on the operating data, the target game unit;
    deleting the operating data of the target game unit when the target game unit has been in pause for a duration threshold;

sending a second data request carrying the unit identifier of the target game unit to the server when a pause cancellation instruction of the target game unit is received; and receiving second operating data of the target game unit sent by the server, and running, based on the second operating data, the target game unit.

2. The method according to claim 1, after running the target game unit, further comprising:

sending, when user operation information is received, the user operation information to the server, so that the server determines a control instruction corresponding to the user operation information; and receiving the control instruction sent by the server, and executing the control instruction in the target game client.

3. The method according to claim 1, further comprising:

deleting the startup data and the operating data of the target game client when the target game client has not been running for a duration threshold.

4. The method according to claim 1, further comprising:

deleting the operating data of the target game unit when the target game client is not running while another game unit has been running for a duration threshold.

5. The method according to claim 1, further comprising:

when a data volume of a locally-stored portion of the operating data reaches a preset data volume threshold, deleting at least part of the locally-stored portion of the operating data.

6. The method according to claim 1, the startup data comprising at least configuration data and display data of a basic interface, and the operating data of the target game unit comprising at least display data of the target game unit.

7. The method according to claim 1, after receiving the startup instruction of the target game client, further comprising:

blocking at least one of a system notification, a push message, an SMS message, and a call.

8. The method according to claim 1, wherein the target game unit is a logical division of a game included in the game list, and the unit identifier associates the target game unit with at least one of a game story and a game map.

9. The method according to claim 1, wherein displaying the game list based on the display data comprises: displaying startup icons of a plurality of game clients under multiple categories, including:

displaying, under a first category, a startup icon of a game client historically used by a user;

displaying, under a second category, a startup icon of a game client whose time difference between the release time and the current time is within the duration range; and displaying, under a third category, a startup icon of a game client whose number of times of user requests reaches the preset threshold, wherein the target game client is one of the plurality of game clients.

10. A non-transitory computer-readable medium containing computer-executable program for, when being executed by a processor, implementing a method for running a game client, the method comprising:

in response to receiving a game-list display instruction, sending a game-list display request to a server;

receiving display data of a game list, sent by the server;

displaying the game list based on the display data of the game list, the game list including a startup icon associated with a target game client, wherein the display data includes at least one of last run time of the target game client, progress status of last run of the target game client, an indicator identifying that a time difference between release time of the target game client and a current time is within a duration range, and an indicator identifying that a number of times of user requests on the target game client reaches a preset threshold;

receiving a startup instruction of a target game client upon detecting a user selection of the startup icon of the target game client, and send a startup request corresponding to the target game client to a server;

receiving startup data, sent by the server, corresponding to the target game client, and start, based on the startup data, the target game client;

sending, when a preset data obtaining condition of a target game unit in the corresponding target game client is satisfied, a data request carrying a unit identifier of the target game unit to the server;

receiving operating data of the target game unit sent by the server, and run, based on the operating data, the target game unit;

deleting the operating data of the target game unit when the target game unit has been in pause for a duration threshold;

sending a second data request carrying the unit identifier of the target game unit to the server when a pause cancellation instruction of the target game unit is received; and receiving second operating data of the target game unit sent by the server, and running, based on the second operating data, the target game unit.

11. The non-transitory computer-readable medium according to claim 10, wherein the method further comprises:

sending, when user operation information is received, the user operation information to the server, so that the server determines a control instruction corresponding to the user operation information; and receiving the control instruction sent by the server, and execute the control instruction in the target game client.

12. A terminal, comprising: one or more processors; and a memory, the memory storing one or more programs, the one or more programs being configured to be executed by the one or more processors, and the one or more programs comprising instructions for performing the following operations:

in response to receiving a game-list display instruction, sending a game-list display request to a server;

receiving display data of a game list, sent by the server;

displaying the game list based on the display data of the game list, the game list including a startup icon associated with a target game client, wherein the display data includes at least one of last run time of the target game client, progress status of last run of the target game client, an indicator identifying that a time difference between release time of the target game client and a current time is within a duration range, and an indicator identifying that a number of times of user requests on the target game client reaches a preset threshold;

receiving a startup instruction of a target game client upon detecting a user selection of the startup icon of the target game client, and sending a startup request corresponding to the target game client to a server;

receiving startup data, sent by the server, corresponding to the target game client, and starting, based on the startup data, the target game client;

sending, when a preset data obtaining condition of a target game unit in the corresponding target game client is satisfied, a data request carrying a unit identifier of the target game unit to the server;

receiving operating data of the target game unit sent by the server, and running, based on the operating data, the target game unit;

deleting the operating data of the target game unit when the target game unit has been in pause for a duration threshold;

sending second data request carrying the unit identifier of the target game unit to the server when a pause cancellation instruction of the target game unit is received; and receiving second operating data of the target game unit sent by the server, and running, based on the second operating data, the target game unit.

13. The terminal according to claim 12, the one or more programs further comprising instructions for performing the following operations:

sending, when user operation information is received, the user operation information to the server, so that the server determines a control instruction corresponding to the user operation information; and receiving the control instruction sent by the server, and executing the control instruction in the target game client.

14. The terminal according to claim 12, the one or more programs further comprising an instruction for performing the following operation:

deleting the startup data and the operating data of the target game client when the target game client has not been running for a duration threshold.

15. The terminal according to claim 12, the one or more programs further comprising an instruction for performing the following operation:

deleting the operating data of the target game unit when the target game unit is not running while another game unit has been running for a duration threshold.

16. The terminal according to claim 12, the one or more programs further comprising an instruction for performing the following operation:

when a data volume of a locally-stored portion of the operating data reaches a preset data volume threshold, deleting at least part of the locally-stored portion of the operating data.

17. The terminal according to claim 12, the startup data comprising at least configuration data and display data of a basic interface, and the operating data of the target game unit comprising at least display data of the target game unit.

18. The terminal according to claim 12, the one or more programs further comprising an instruction for performing the following operation:

blocking at least one of: a system notification, a push message, an SMS message, or a call.

* * * * *